United States Patent Office.

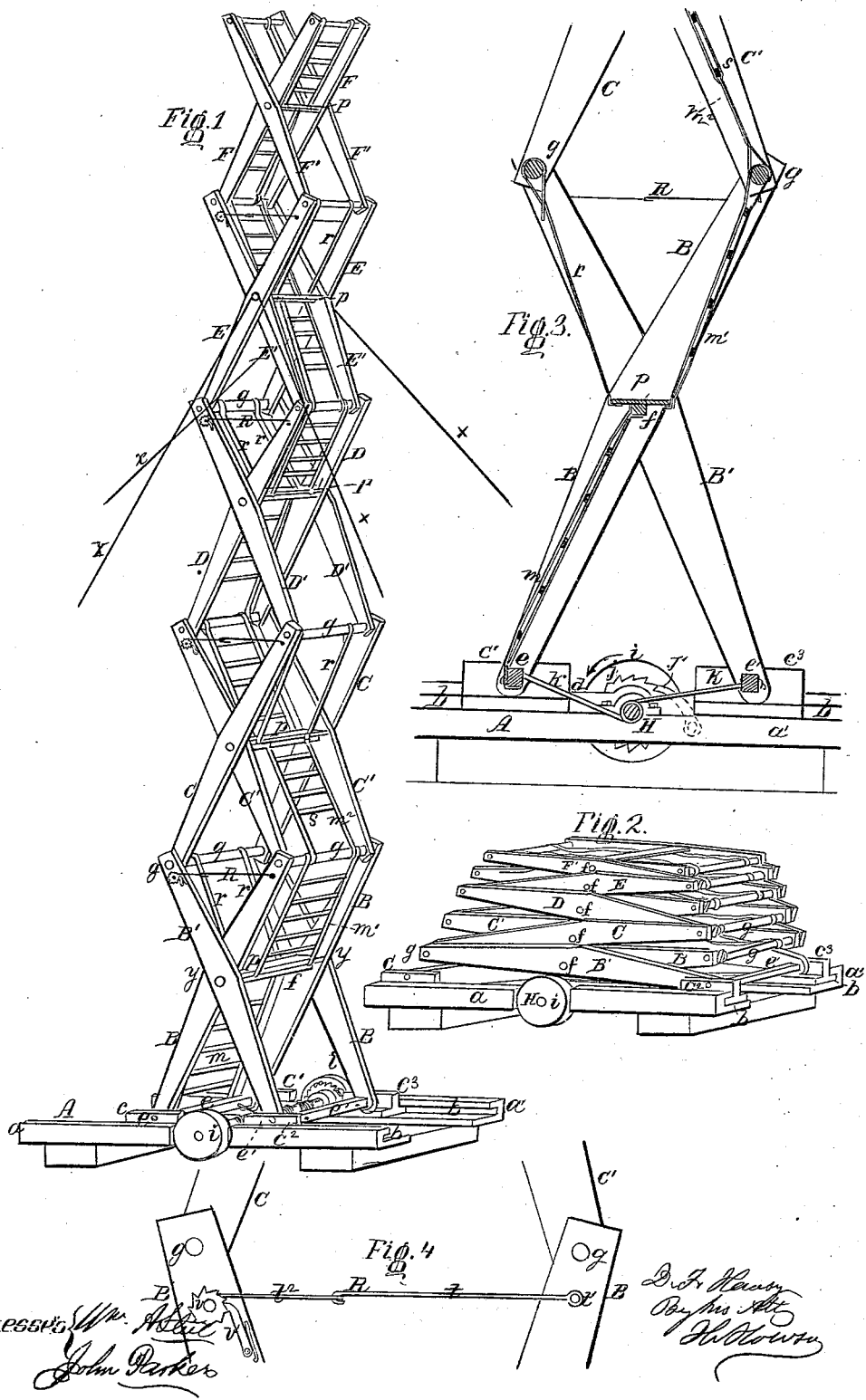

D. F. HAASZ, OF PHILADELPHIA, PENNSYLVANIA.

Letters Patent No. 93,877, dated August 17, 1869.

IMPROVED FIRE-LADDER.

The Schedule referred to in these Letters Patent and making part of the same.

*To all whom it may concern:*

Be it known that I, D. F. HAASZ, of Philadelphia, Pennsylvania, have invented an Improved Extension-Ladder; and I do hereby declare the following to be a full, clear, and exact description of the same.

My invention consists of an extension-ladder, constructed in the peculiar manner fully described hereafter, and mounted upon and secured to a frame or wheeled truck, so that it can be quickly moved from place to place, the said ladder, (or series of ladders,) being so arranged, that when depressed and folded, it shall lie flat upon the truck, and occupy but little room, while when required for use, it can be elevated much more quickly, and to a greater height than ordinary ladders.

In order to enable others skilled in the art to make and apply my invention, I will now proceed to describe its construction and operation, reference being had to the accompanying drawing, which forms a part of this specification, and in which—

Figure 1 is a perspective view of my improved fire-ladder, as it appears when raised to its full height;

Figure 2, a perspective view of the same, folded;

Figure 3, an enlarged sectional view of the lower portion of the ladder; and

Figure 4, a detached view, also enlarged.

Similar letters refer to similar parts throughout the several views.

A represents a horizontal frame, arranged to be secured upon a wheeled truck, or so constructed that it shall in itself form the body of a truck, to which wheels can be directly attached.

In the opposite side-pieces $a$ and $a'$, of this frame, are formed grooves or ways, $b$ $b'$, for the reception of sliding blocks $c, c^1, c^2$, and $c^3$, which are prevented from approaching nearer to each other than is represented in figs. 1 and 3, by stops $d$ $d$, arranged at the centre of the opposite side-pieces of the frame.

The sliding blocks $c$ and $c^1$ are connected together by a cross-rod, $e$, to which, at points adjacent to the said blocks, are hung the lower ends of two bars B B, and to the cross-rod $e'$, which connects the sliding blocks $c^2$ and $c^3$ together, are hung two similar rods, B' B'.

The bars B B and B' B' cross each other at points $y$ $y$, fig. 1, and are all four connected together by a single rod, $f$, upon which they are arranged to freely turn, and to rods $g$ $g$, which join together the upper extremities of these crossed bars, are connected the lower ends of four similar, but somewhat shorter bars, $c$ $c$ and $c^1$ $c^1$, which are likewise crossed and connected together by a single rod, $f'$.

Bars D and D' are in like manner connected to the upper ends of the bars C, and are surmounted, in the present instance, by two other sets of bars, marked respectively E and F, but the structure may, if desired, be carried to a still greater height by the addition of other sets of bars.

In the centre-pieces or stops $d$ $d$, of the frame A, are formed bearings, in which is arranged to turn a shaft, H, provided at each end with a hand-wheel, $i$, which should be furnished with a number of projecting arms or handles, and upon the same shaft H is a ratchet-wheel, $j$, with the teeth of which engages a pawl, $j'$, the latter, so long as it is in contact with the wheel, preventing the said shaft from being turned in a direction contrary to that indicated by the arrow.

Each of the cross-rods $e$ and $e'$ of the sliding-blocks $c$ $c^1$, &c., is connected to the shaft H by two cords or chains $k$, arranged to be wound upon the said shaft, and to thus draw the blocks toward each other, when the hand-wheels are turned as above described.

This drawing of the sliding blocks together causes the extremities of the crossed bars B C D, &c., to also approach each other, and to consequently elevate the whole structure, as illustrated in fig. 1, and if the pawl $j'$ be thrown back from its ratchet-wheel, so as to permit the shaft H to be turned in the contrary direction, the cords $k$ will be unwound from the same, and the blocks $c$ permitted to slide outward, which they will immediately, by reason of the weight of the bars above them, the latter turning freely upon their several joints, until they assume a horizontal, or nearly horizontal position, and the whole structure is depressed, as seen in fig. 2.

It will be observed, on reference to figs. 1 and 3, that the above structure of crossed bars is furnished entirely to the top with a continuous series of ladders, which, for the sake of lightness, and so that they may by sufficiently yielding, and not interfere with the proper folding of the bars, are made of leather bands, to which wooden rungs are riveted, or otherwise properly secured.

The first or lowermost of these ladders, marked $m$, is secured at the bottom to the cross-bar $e$, and extends upward between the bars B B to the rod $f$, to which its upper end is secured. (See fig. 3.)

The second ladder $m^1$ forms a continuation of the first, and extends, in the same direction, to the top of the bars B, where it is attached to the rod $g$, by buckles or otherwise, in such a manner that it can be readily tightened, should it become slack by long-continued use, &c.

The lower end of this ladder $m'$ is not secured directly to the cross-rod $f$, but to one edge of a platform, $p$, which is attached to the upper edge of the said cross-rod, and in order to prevent this platform from turning, and to sustain it in a horizontal position, when the structure is elevated, two straps, $r$ $r$, depending from the cross-rod $g$, at the upper ends of the bars B', are secured to the opposite edge of the said platform, as best observed in fig. 3.

There is one of these platforms for each set of bars B C D, &c., and each is in like manner sustained and prevented from turning by a ladder upon one side, and by bracing-straps $r\ r$, attached to its opposite side.

It will be observed, on referring to fig. 3, that there is a considerable space between the cross-rod $g$ and the lowest rung $s$, of the third ladder $m^2$, the object of which is to enable a person, after having climbed to the top of the ladder $m^1$, to pass between the straps forming the sides of the ladder $m^2$, and to then turn and ascend the last-named ladder, upon its upper side, which could not be done if the rungs were arranged in the ordinary manner.

For the purpose of strengthening the structure, and of rendering it perfectly rigid, when raised to its full height, I employ braces R, fig. 4, which are arranged close to the upper end and on each side of each set of bars.

This brace consists of a hooked rod, $t$, hung to one of the bars, at a point, $t^1$, and adapted to the looped end of a cord, $t^2$, which is arranged to be wound upon a drum, turning upon a short spindle, $r$, attached to the opposite bar.

A ratchet, to which is adapted a pawl, $v'$, prevents the cord from unwinding from the drum, and enables the rod to be tightened, as desired.

By means of this arrangement, the slides $c$, when drawn up to the stops $d$, are held firmly against the same, and the several sets of bars are rigidly braced at their points of connection, which are the points at which the structure would be most likely to yield.

In using the above apparatus, it is wheeled as close as may be desired to the burning building, or to an adjacent building, which is to be entered from above, or to be protected by streams of water. The apparatus is then quickly elevated in the manner before described, by means of the hand-wheels $i\ i$, is strengthened and made rigid by the braces R R, and is prevented from swagging, or from falling laterally, by means of guys $x\ x$, fig. 1, which extend from near the top of the structure to convenient points of attachment at the surface of the ground.

After having thus stationed and secured the apparatus, the ladders can be mounted with perfect safety, and hose carried to as high a point as desired, each of the platforms $p$ forming a foot-rest, upon which one or more men can stand, enabling them to perform their duty of directing streams of water much more advantageously than could be done from an ordinary ladder.

A principal advantage of my invention, however, is in the rapidity and ease with which the ladder can be elevated, the time required being but a tithe of that which is occupied in removing ordinary ladders from a truck, and then placing them against walls, &c.

Another important advantage is its security, the apparatus being entirely self-supporting, so that those accidents, which so frequently happen from the falling of walls against which fire-ladders have been placed, cannot possibly occur when it is used.

It will be evident that my invention, although especially designed as a fireman's ladder, can also be advantageously employed as a fire-escape.

I claim as my invention, and desire to secure by Letters Patent—

1. A fire-ladder, consisting of sets of bars B C D, &c., crossed and connected together, substantially as described, arranged to be quickly elevated or depressed, and to be securely braced when elevated, and having a series of short ladders arranged in a line with each other, constructed substantially as specified, and reaching entirely to the top of the structure, with intermediate landings or platforms $p$.

2. The braces R, in combination with the ratchets and pawls, substantially as and for the purpose described.

3. The platforms $p$, attached to the cross-rods $f$, and supported in a horizontal position by the ladders upon one side, and by bracing-straps $r\ r$ upon the opposite side, all substantially as herein set forth.

In testimony whereof, I have signed my name to this specification, in the presence of two subscribing witnesses.

D. F. HAASZ.

Witnesses:
 E. H. BAILY,
 LOUIS BOSWELL.